United States Patent [19]

Marteau

[11] 4,276,519

[45] Jun. 30, 1981

[54] HIGH YIELD DIFFRACTION LIMITED LASER OSCILLATOR

[75] Inventor: Jean M. Marteau, Bures-Sur-Yvette, France

[73] Assignee: Quantel S.A., France

[21] Appl. No.: 948,259

[22] Filed: Oct. 3, 1978

[30] Foreign Application Priority Data

Oct. 4, 1977 [FR] France .................................. 77 29757

[51] Int. Cl.³ .............................................. H01S 3/08
[52] U.S. Cl. ............................................... 331/94.5 C
[58] Field of Search ................. 331/94.5 C, 94.5 M, 331/94.5 S, 94.5 Q, 94.5 D

[56] References Cited

U.S. PATENT DOCUMENTS 3,426,294   2/1969   Koester ......................... 331/94.5 Q
3,500,241   3/1970   Bsorkholm ..................... 331/94.5 Q

*Primary Examiner*—William L. Sikes
*Attorney, Agent, or Firm*—Holman & Stern

[57] ABSTRACT

The laser oscillator comprises an optical amplifying medium and a diaphragm disposed between two mirrors defining a cavity. The diaphragm is placed between the amplifying medium and the mirror having a high coefficient of reflection. A polarizer is placed between the diaphragm and the amplifying medium. A device for rotating the polarization of the output beam of the oscillator and for transforming and returning this beam by reflection to the amplifying medium and the polarizer is provided so that, when the beam again reaches the amplifying medium, it has a section roughly equal to the section of the amplifying medium.

21 Claims, 9 Drawing Figures

HIGH YIELD DIFFRACTION LIMITED LASER OSCILLATOR

The present invention relates to laser oscillators and more particularly to increasing the yield of diffraction limited laser oscillators.

Among laser oscillators there exist relaxation lasers and active Q switch lasers.

The invention is more particularly applied to the last-mentioned lasers.

A relaxation laser comprises essentially a light amplifying medium placed between two mirrors.

Such an assembly constitutes an optical oscillator as soon as the gain of the amplifying medium compensates for the losses due to the transmission of the mirrors, to the diffraction and to any absorption present in the cavity.

In such a system, the output power remains low since energy cannot be stored.

An active Q switch laser comprises, apart from the amplifying medium and the mirrors of the relaxation laser, an optical switch disposed between the amplifying medium and one of the mirrors.

This optical switch may be active or passive and its transmission varies rapidly in the course of time.

In such a system it is possible to successively accumulate a lot of energy in the amplifying medium without oscillation thereof and then open the optical switch and liberate within a brief time the energy accumulated by the oscillator.

The first apparatus of this type emitted light in a large solid angle since the diameter of their beam corresponded to a high Fresnel number which allowed the light waves propagated at a small angle to be amplified.

If $\lambda$ is the wavelength of the light emitted and L the length of the optical cavity, it is known that the condition for which the laser emits a planar wave is that the diameter D of the beam, which may be limited by a diaphragm placed in the cavity, is such that:

$$\frac{\lambda}{D} \sim \frac{D}{L} \text{ that is } D \sim \sqrt{\lambda L}.$$

By way of example, in respect of a wavelength $\lambda = 1\mu$ and a cavity length L = 1 m, the diameter D of the beam is equal to about 1 mm.

Owing to the high quality of the beam required of the apparatus, it is now attempted to obtain beams having qualities close to those of a planar wave so that a diaphragm must be disposed in the cavity.

However, in such a system, the volume of the amplifying medium is imperfectly utilized owing to the small dimension of the beam which passes through the diaphragm.

In order to improve the yield, it has been envisaged to decrease the volume of the amplifying medium so as to reduce it to its useful value.

Unfortunately, this solution is inapplicable for reasons related to the mechanical resistance of the amplifying medium, to the coupling and other reasons.

Consequently, the presently-employed apparatus, although they emit a high quality beam, have a deplorable yield since a large part of the pumped medium remains unused.

A first solution of this problem has been proposed.

It concerns a system of unstable cavity type or a diffraction coupled oscillator.

In such a system, the essential elements are the same as those of a conventional oscillator but one of the mirrors is of small size so as to ensure a limitation of the section of the beam.

This mirror often has a curvature.

In the course of operation, the part of the wave reinjected into the cavity by the small mirror has a good optical quality.

There is in this way obtained at the output of the oscillator constructed in this way a beam which utilizes well the amplifying medium and whose qualities may be rather close to those of a planar wave.

This system however has a certain number of drawbacks.

The presence of the small mirror implies a "hole" in the spatial distribution of the beam.

The divergent character of the wave in the cavity renders difficult the introduction of frequency-selecting optical elements in the cavity.

The very low apparent coefficient of reflection of the small mirror implies that the medium has a very high gain and therefore a large amount of imperfectly utilized stored energy, since the oscillation threshold of this system is by construction very high, and a large part of the energy stored is abandoned.

An object of the invention is to provide a laser oscillator which is capable of delivering a beam of excellent quality with a distinctly higher yield than existing oscillators, owing to optimum utilization of the energy stored in the amplifying medium.

According to the invention there is provided a diffraction limited laser oscillator comprising a cavity formed by two mirrors between which are disposed an optical amplifying medium and a diaphragm, wherein the diaphragm is placed between the amplifying medium and the mirror having a high coefficient or reflection, and there is further provided a polarizer placed between the diaphragm and the amplifying medium and a device for rotating the polarization of the output beam of the oscillator, for transforming said beam and for returning it by reflection to the amplifying medium and polarizer in such manner that, when it once again reaches the amplifying medium, it has a section which is substantially equal to that of said amplifying medium.

According to a particular feature of the invention, the rotating and returning device comprises means for rotating the polarization and a mirror.

Further features of the invention will be apparent from the ensuing description.

In the accompanying drawings, given merely by way of example:

Although the state of the art has already been referred to hereinbefore it will be briefly recalled with reference to the drawings.

Figure 1:
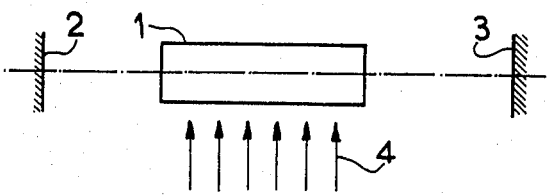
FIG. 1 is a diagrammatic view of a relaxation laser.

FIG. 1 represents a relaxation laser which comprises a light amplifying medium 1 and two mirrors 2 and 3 disposed on opposite sides of the amplifying medium which is pumped by a source of light 4.

Figure 2:
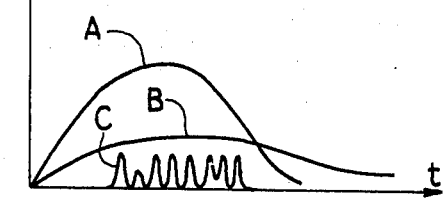
FIG. 2 is a graph showing the operation of the laser of FIG. 1.

The operation of the laser of FIG. 1 is illustrated by the graph of FIG. 2. The curves A, B and C show respectively the evolution with respect to time of the pumping power, the population and the emitted laser power.

This graph clearly shows that, owing to the fact that it is impossible to store sufficient energy in the amplifying means 1, the output power C of the laser remains limited.

Figure 3:
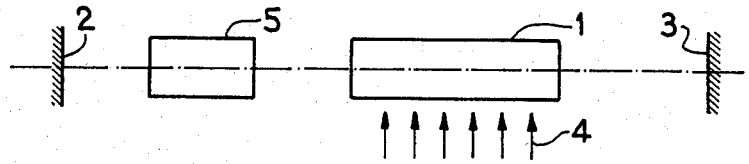
FIG. 3 is a diagrammatic view of an active Q switch laser.

FIG. 3 represents an active Q switch laser which comprises, in addition to the elements which form part of the construction of the laser of FIG. 1, an optical switch 5.

Figure 4:
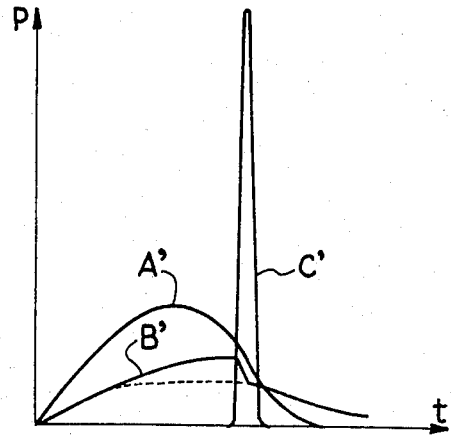
FIG. 4 is a graph showing the operation of the laser of FIG. 3.

With reference to the graph of FIG. 4, it is seen that for a pumping power A' equivalent to that shown in FIG. 2, the sudden opening of the optical switch 5 at the end of a predetermined pumping time during which it was maintained closed, produces the liberation of energy accumulated in the amplifying medium in the form of a pulse C'.

Figure 5:
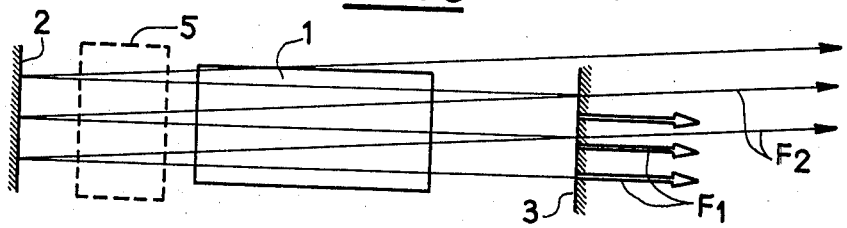
FIG. 5 is a diagrammatic view of the emission of a laser without a diaphragm.

However, as shown in FIG. 5, the output radiation of a laser whether it be a relaxation or an active Q switch laser, can be propagated within a relatively large solid angle.

The beam of interest is the beam F1 which is propagated in a direction perpendicular to the mirrors 2 and 3 which define the cavity.

This is the sole radiation which would be observed if the cavity had a diaphragm of rather small diameter $D_o \sim \sqrt{\lambda L}$.

Now, if the useful diameter of the beam, and therefore of the amplifying medium, and of the mirrors exceeds Do, beams such as F2 can be propagated in the cavity at a small angle.

Figure 6:
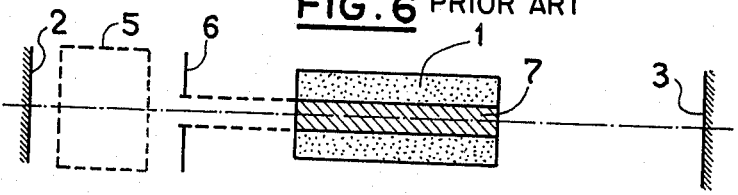
FIG. 6 is a diagrammatic view showing a laser provided with a diaphragm.

In order to reduce to a minimum the propagation of beams such as F2 which adversely affect the purity of the emission, the system shown in FIG. 6 comprises a diagraphm 6 placed for example between the mirror 2 and the amplifying medium 1 or, when it concerns an active Q switch laser, between the optical switch 5, shown in dotted lines in FIG. 6, and the amplifying medium.

The diaphragm 6 defines in the amplifying medium 1, a useful volume 7 so that the remainder of the medium 1, although it is subjected to the pumping, is unused and the energy stored in this part is lost.

Figure 7:
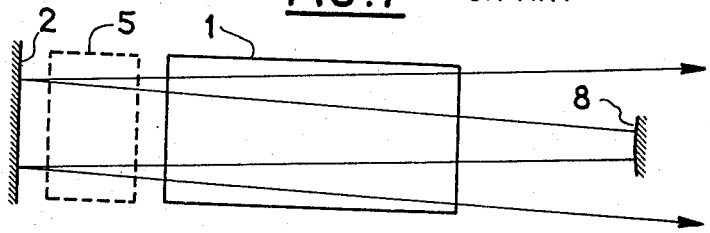
FIG. 7 shows a laser coupled by the diffraction.

In order to overcome this drawback, in the system of FIG. 7, the function of one of the mirrors of the cavity and of the diaphragm is performed by a mirror 8 which is divergent and of small size. This so-called unstable cavity system has the drawbacks mentioned hereinbefore.

Figure 8:
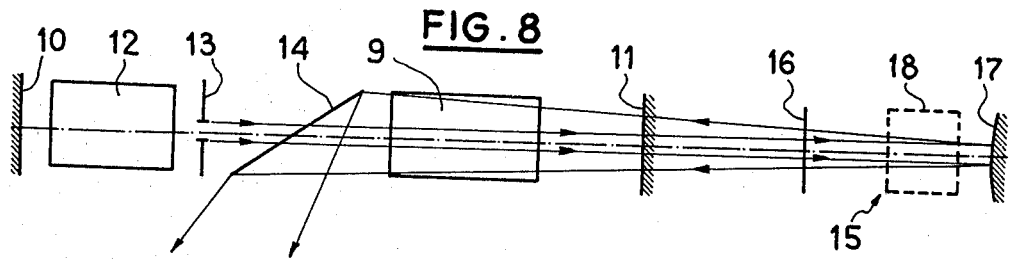
FIG. 8 is a diagram showing an improved laser according to the invention.

The laser oscillator according to the invention is represented diagrammatically in FIG. 8.

This oscillator comprises a light amplifying medium 9 disposed between a first mirror 10 and a second mirror 11 which constitutes the output mirror of the oscillator. In the illustrated embodiment, it concerns an active Q switch laser so that there is disposed between the first mirror 10 and the amplifying medium 9 an optical switch 12. Between the latter and the amplifying medium there is disposed a diaphragm 13 which renders the illustrated system a diffraction limited oscillator.

In order to increase the yield of such an oscillator, the latter further comprises a polarizer 14 placed between the diaphragm 13 and the amplifying medium 9 and, on the output path of the laser beam, a device 15 for rotating the polarization of and returning the beam.

This rotating and returning device 15 comprises in the illustrated embodiment a quarter-wave plate 16 and a curved mirror 17 the curvature of which is such that when returned into the amplifying medium the beam has a diameter which is the same as that of the amplifying medium.

In the presently-described embodiment, this quarter-wave plate is independent of the returning mirror 17. Its effect is based on the natural birefringence of certain optical materials such as the quartz or on the birefringence induced in the optical media by mechanical or electromagnetic stresses. There may also be employed the birefringence induced by the same effects in dielectric layers which may be employed in the construction of the mirror 17. In this case, the quarter-wave plate coincides with the mirror 17.

The light rotating and reflecting device 15 may also be constructed by using a rotator based on the natural rotatory power of certain optical media such as the quartz or on the rotatory power induced by the Faraday effect.

The system of FIG. 8 may comprise an optical system employed for increasing the qualities of the system and shown in dotted lines. It is in particular intended to adapt the diameter of the beam to the dimensions of the medium 9.

The polarizer 14 may be formed by a Glan prism, a dielectric polarizer or other polarizer.

The mirror 10 is a mirror having a high coefficient of reflection forming the oscillating cavity.

The diaphragm 13 determines the quality of the beam.

The mirror 11 which is the output mirror of the cavity is chosen to have a low coefficient of reflection. The position of the quarter-wave plate 16 and that of the mirror 17 are so chosen that after reflection on the mirror 17, the wave returning coaxially with the wave emitted by the laser has a polarization perpendicular to that of the emitted wave.

The oscillator according to the invention operates in the following manner:

When the pumping energy is applied to the amplifying medium 9, the latter, associated with the mirrors 10 and 11 and the optical switch 12, behaves in the manner of an amplifying medium of a conventional active Q switch laser.

When the optical switch 12 is opened, the laser emits a pulse of light and its radiation is limited by the diaphragm 13.

The polarizer 14 imparts to the beam emitted by the laser a well-determined polarization. After propagation in the amplifying medium 9, a part of this light passes through the output mirror 11 and reaches the quarter-wave plate 16. It is then reflected by the mirror 17 which, in combination with the quarter-wave plate, rotates its polarization. The mirror 17 is a divergent mirror and the beam reflected thereby is a divergent beam which, when it reaches the amplifying medium 9, has a section equal to that of the medium so that it benefits from all of the energy accumulated in the medium. At the output side of the amplifying medium 9, the beam amplified in this way impinges on the polarizer 14, but as it has a polarization which is different from that it had when it travelled toward the output mirror 11, it is reflected by the polarizer and leaves the cavity in the form of a radiation of highly increased power.

Such a radiation may be easily transformed, for example, into a parallel beam by means of a conventional optical system (not shown).

The system just described permits obtaining a beam whose quality is as good as that of an output beam of a diffraction limited laser employing a diaphragm and having high energy.

Consequently, by means of the invention, it is possible to considerably increase the yield of a diffraction limited laser oscillator owing to an improved utilization of the excited volume.

This system has moreover the following advantages:

The beam obtained is without a "hole" and has a quality which is as good as that of a conventional diffraction limited oscillator.

The system according to the invention permits easily proceeding to a frequency selection in the cavity by the introduction of accessory elements therein.

The system according to the invention may be constructed just as well with a solid amplifying medium as with a liquid or gaseous medium.

There will now be given a precise example of the construction of a diffraction limited active Q switch laser oscillator of increased yield according to the invention.

It concerns a generator of an infrared light pulse of a duration which is adjustable between a few nanoseconds and a few tens of nanoseconds.

The mean power of the generator is 10 to 20 MW and the line width is adjustable between 50 MHz and 3,000 MHz.

The laser employs the transition at 1.06$\mu$ of neodymium ion in a YAG (yttrium aluminium garnet) crystal.

The resonant cavity formed by the elements 10 to 16 generates a luminous pulse whose duration is a function of the following three parameters.

Population inversion in the amplifying medium:
Length of the cavity;
Over-voltage of the cavity.

The component elements of the construction of the cavity are:

10—Mirror having a coefficient of reflection R~99% at 1.06$\mu$
12—Switch having a Pockels cell of the type QUANTEL 301
13—Transverse mode selecting diaphragm having a diameter of 1 mm
14—Glan Thomson polarizer
9—Amplifying head provided with a bar of YAG having a diameter of 6 mm and a length of 75 mm mounted in a head of type QUANTEL HH 305
11—Mirror having a low coefficient of reflection R~8%.

The device 15 for rotating the polarization comprises a quarter-wave plate 16 and a mirror 17 having a coefficient of reflection R~99% and such curvature that when returned to the amplifying medium, the beam has a diameter of 5 mm, that is to say equal to the diameter of the medium 9.

The output pulse has the following characteristics:
Duration: 2 to 30 ns
Energy: 50 to 150 mJ
Circular symmetry of the diffraction limited wave
Distribution of the energy in a pseudo-Gaussian envelope
Low modulation rate.

The following comparative table gives the characteristics of a diffraction limited active Q switch laser, an unstable cavity active Q switch laser and an active Q switch laser according to the invention.

|  | Diffraction limited active Q switch laser. | Unstable cavity active Q switch laser | Active Q switch laser according to the invention. |
| --- | --- | --- | --- |
| Amplifying medium employed | YAG | YAG | YAG |
| Wavelength emitted | 1.06 $\mu$ | 1.06 $\mu$ | 1.06 $\mu$ |
| Pulse duration | 2 to 20 ns | 10 ns | 2 to 20 ns |
| Maximum energy | 3 to 10 m J | 150 m J | 50 to 150 m J |
| Line width | 0.0015 to 0.1 cm$^{-1}$ | 0.1 cm$^{-1}$ | 0.0015 tp 0.1 cm$^{-1}$ |
| Spatial distribution | pseudo-Gaussian circular | annular | pseudo-Gaussian circular |
| Divergence | 0.4 to 0.5 mRad for 95% of the energy | 0.5 mRad for 80% of the energy | 0.4 to 0.5 mRad for 95% of the energy |

Figure 9:
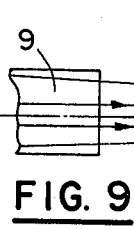
FIG. 9 is a fragmentary diagram showing another embodiment of a laser improved according to the invention.

Although in the described and illustrated embodiment the polarization rotating device 15 comprises a quarter-wave plate 16 separate from the output mirror 11 of the cavity, this quarter-wave plate may be used as shown at FIG. 9 instead of the output mirror 11, in which case the latter is eliminated.

Although in the embodiment described with reference to FIG. 8, the device for rotating the polarization and reflecting the beam comprises a divergent mirror 17, it will be understood that, depending on the divergence of the laser, the distance between the laser and the mirror 17 and the user's desire to obtain a divergent or parallel beam in the region of the amplifying medium 9, planar mirrors or mirrors having curvatures, alone or associated with an optical system 18 may have to be used.

Having now described my invention what I claim as new and desire to secure by Letters Patent is:

1. A diffraction limited laser oscillator comprising first and second mirrors defining a cavity, an optical amplifying medium and a diaphragm interposed between the mirrors, the diaphragm being placed between the amplifying medium and said first mirror which has a high coefficient of reflection, the oscillator further comprising a polarizer placed between the diaphragm and the amplifying medium and a device for rotating the polarization of the beam of light leaving said cavity through said second mirror, for transforming and returning said beam by reflection to the amplifying medium and the polarizer, said device for rotating the polarization of said beam being located outside said cavity on the path of said beam, whereby, when the beam again reaches the amplifying medium, it has a section substantially equal to the section of the amplifying medium.

2. A laser oscillator as claimed in claim 1, further comprising an optical switch located between said first mirror and said amplifying medium so that it constitutes an active Q switch laser oscillator.

3. A laser oscillator as claimed in claim 1 or 2, wherein said device for rotating the polarization, transforming and returning said beam of the oscillator comprises a polarization rotating means and a third mirror placed in the path of said beam.

4. A laser oscillator as claimed in claim 3, wherein said polarization rotating means is a natural birefringence quarter-wave plate.

5. A laser oscillator as claimed in claim 4, wherein said polarization rotating means is separate from said third mirror.

6. A laser oscillator as claimed in claim 5, wherein said third mirror is a divergent mirror.

7. A laser oscillator as claimed in claim 3, wherein said polarization rotating means is a quarter-wave plate having birefringence induced by stresses.

8. A laser oscillator as claimed in claim 7, wherein said stresses are mechanical stresses.

9. A laser oscillator as claimed in claim 7 wherein said stresses are electromagnetic stresses.

10. A laser oscillator as claimed in claim 7, wherein said polarization rotating means is separate from said third mirror.

11. A laser oscillator as claimed in claim 10, wherein said third mirror is a divergent mirror.

12. A laser oscillator as claimed in claim 3, wherein said polarization rotating means is a rotator having a natural rotatory power.

13. A laser oscillator as claimed in claim 12, wherein said polarization rotating means is separate from said third mirror.

14. A laser oscillator as claimed in claim 13, wherein said third mirror is a divergent mirror.

15. A laser oscillator as claimed in claim 3, wherein said polarization rotating means is a rotator having a rotatory power induced by the Faraday effect.

16. A laser oscillator as claimed in claim 15, wherein said polarization rotating means is separate from said third mirror.

17. A laser oscillator as claimed in claim 16, wherein said third mirror is a divergent mirror.

18. A laser oscillator as claimed in claim 3, wherein said third mirror is a mirror having dielectric layers and said polarization rotating means is a means having a birefringence induced in the dielectric layers of said mirror.

19. A laser oscillator as claimed in claim 3, comprising an optical system associated with said third mirror for adapting the diameter of said beam to the dimensions of said amplifying medium.

20. A laser oscillator as claimed in claim 3, wherein the polarization rotating means constitutes an element separate from said second mirror.

21. A laser oscillator as claimed in claim 3, wherein the polarization rotating means is coincident with said second mirror.

* * * * *